(No Model.) 3 Sheets—Sheet 1.
J. W. HYATT.
APPARATUS FOR MAKING FLUID EXTRACTS.
No. 423,869. Patented Mar. 18, 1890.
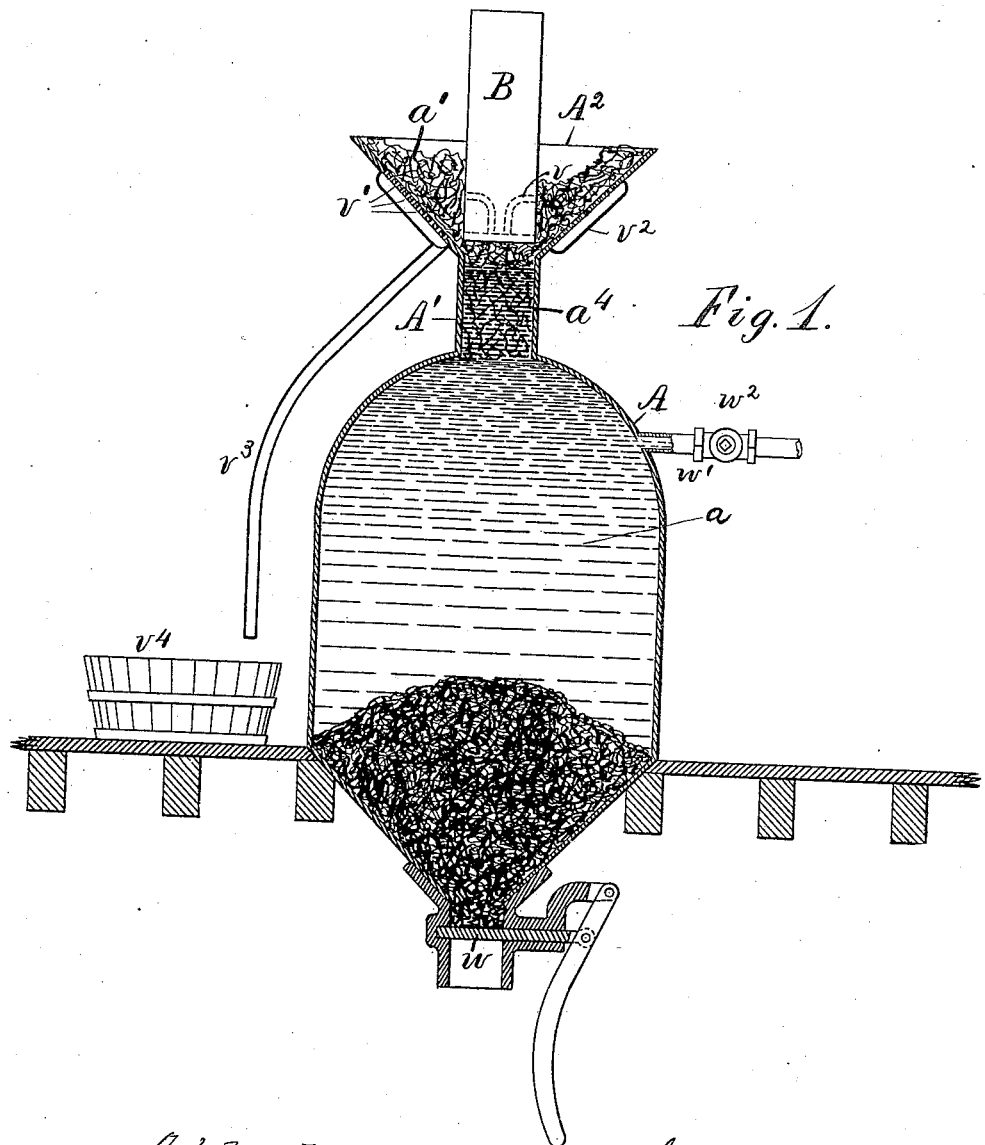
Attest:
L. Lee.
L. J. Miller
Inventor.
John W. Hyatt, per
Crane & Miller, Attys.

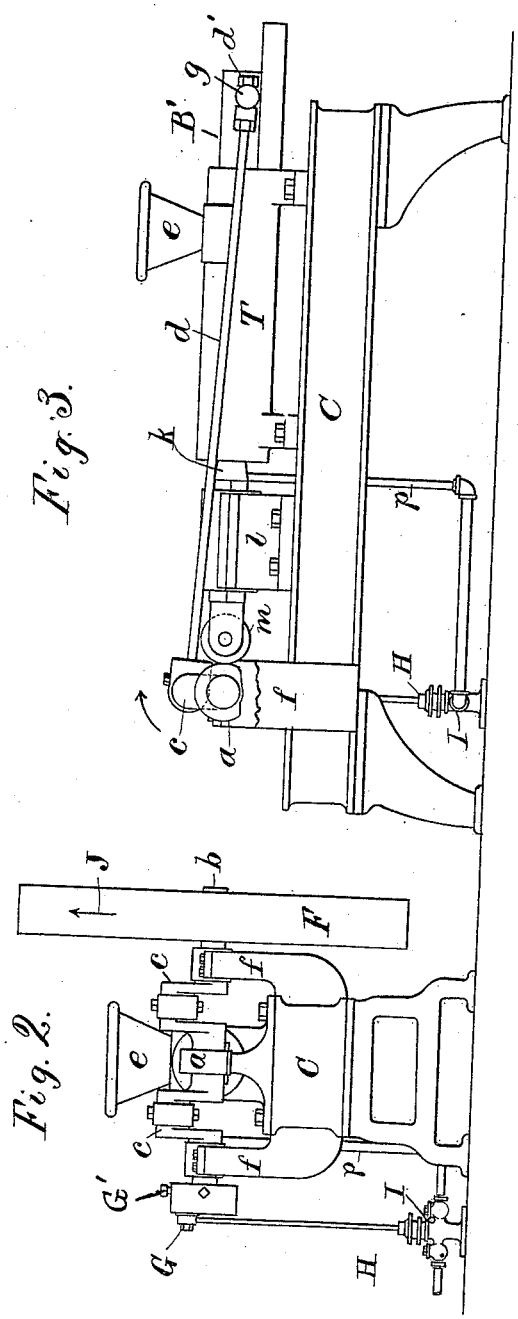

(No Model.) 3 Sheets—Sheet 3.
J. W. HYATT.
APPARATUS FOR MAKING FLUID EXTRACTS.
No. 423,869. Patented Mar. 18, 1890.
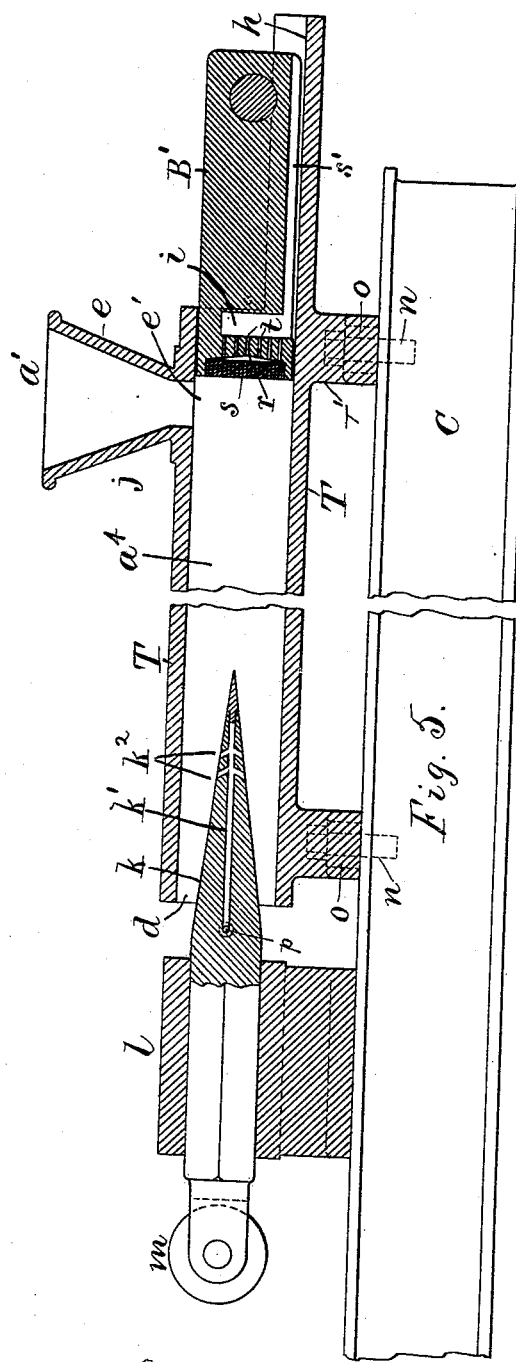
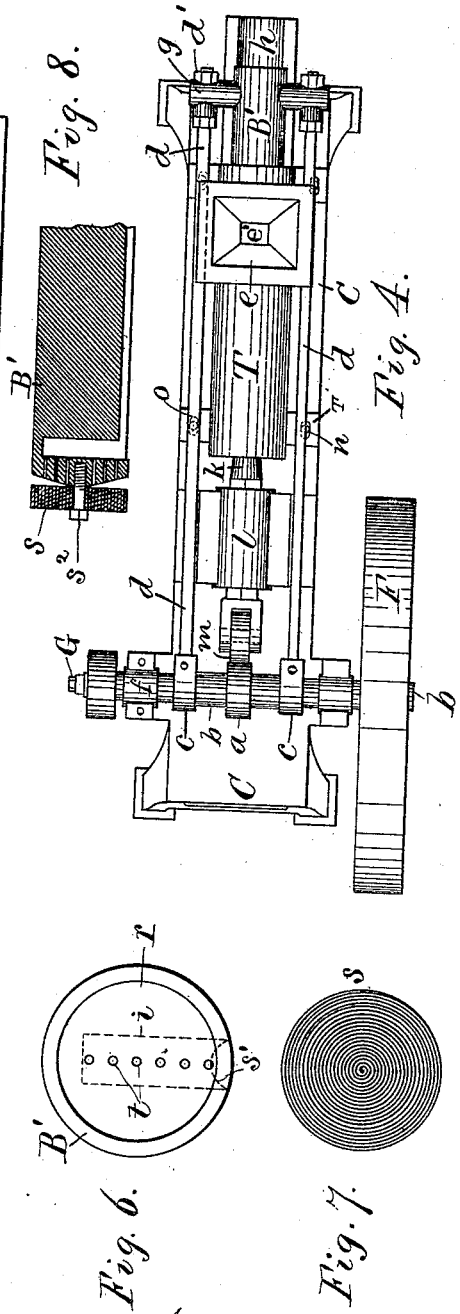
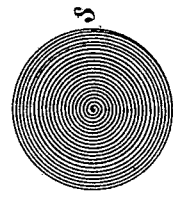
Attest:
H. J. Miller
Chas. M. Lum
Inventor.
John W. Hyatt, per
Crane & Miller, Attys.

UNITED STATES PATENT OFFICE.

JOHN W. HYATT, OF NEWARK, NEW JERSEY, ASSIGNOR TO THE AMERICAN EXTRACTOR COMPANY, OF SAME PLACE.

APPARATUS FOR MAKING FLUID EXTRACTS.

SPECIFICATION forming part of Letters Patent No. 423,869, dated March 18, 1890.

Application filed March 9, 1889. Serial No. 302,610. (No model.)

*To all whom it may concern:*

Be it known that I, JOHN W. HYATT, a citizen of the United States, residing at Newark, Essex county, New Jersey, have invented certain new and useful Improvements in Apparatus for Making Fluid Extracts, fully described and represented in the following specification and the accompanying drawings, forming a part of the same.

The object of this invention is to make a fluid extract from sugar-cane, beets, hops, apples, and any other suitable material by a continuous process, and to thus avoid the delay incident to the charging and cleansing of the apparatus. Crushing-rollers have heretofore been used for such a purpose, as in sugar-cane mills; but such apparatus is not adapted to extract all the juice from the sugar-cane, and my present invention is not intended to operate in the same continuous manner as a pair of crushing-rollers, but to operate more efficiently in removing the fluid extract from the material.

This invention is a modification of that shown in another application, filed February 18, 1889, Serial No. 300,233, copending herewith, in which means is shown for moving a pervious plunger in and out of a suitable compressing-chamber to compress the material therein and to draw off the fluid extract through the pervious plunger, the material being forced into a reservoir filled with water, which was thereby expelled through the material and assisted to remove the extract therefrom.

In my present invention I have added a supply of fluid under pressure to the reservoir or compression-cylinder, and have provided means for removing the spent material continuously for an indefinite period from the compression-cylinder. The operation of the apparatus is thus rendered continuous for any desired length of time, and the extracting operation may be continued indefinitely as long as the material is supplied to the compressing-cylinder.

In the annexed drawings, Figure 1 represents a view of an apparatus shown in section to represent the simplest form of the mechanism for practicing my invention continuously, and having a reservoir of water connected with the compressing-cylinder. Fig. 2 is an end elevation of an apparatus for operating without a reservoir. Fig. 3 is a side elevation of the same with the fly-wheel removed, and the bearing and crank adjacent to the same broken away to expose the cam behind them. Fig. 4 is a plan of the same apparatus. Fig. 5 is an enlarged view of the bed, the compressing-cylinder, the compressing-plunger, and the conical regulator, the parts being shown in section where hatched at their center line and broken across the middle for want of room upon the drawings. Fig. 6 is an end view of the compressing-plunger upon a still larger scale; Fig. 7, a view of the spiral spring adapted to fit in the head of the plunger to operate as a strainer, and Fig. 8 is a section of the plunger upon the same scale as Fig. 5, with a modified form of strainer.

Fig. 1 is intended simply to illustrate the operation of my invention by the simplest means, A being a reservoir with contracted neck $A'$, terminating in a hopper $A^2$. A plunger B is shown in the hopper with its lower end a little above the aperture to the neck $A'$. The plunger may be reciprocated by any suitable means and may be provided with a fine strainer upon its operative end, as shown at S in Figs. 5, 7, and 8, and apertures $v$ conduct the fluid from such strainer through the sides of the plunger, where it is discharged within the hopper. The hopper is shown provided with perforated walls $v'$, surrounded by a gutter $v^2$, from which the fluid is conducted by a pipe $v^3$ to a receiver $v^4$. The receptacle is shown filled with water $a$ to the bottom of the neck, and the latter partly filled with compressed material $a^4$, and loose material $a'$ is shown in the hopper. The raising of the plunger to the position shown in the figure permits a portion of the loose material to fall beneath the plunger, and the downward movement of the plunger into the neck $A'$ will thus confine the material in the neck and express the juice therefrom, which juice will pass through the strainer and passages $v$, and thence to the receiver $v^4$. It will be understood that the material is sustained against the compressing force of the plunger by the resistance of the water in the reservoir A, the crude material being prevented from falling into the water if its specific gravity be greater than that of the water by the friction of the compressed material $a^i$ in the neck A'. As each charge of compressed material is forced downward into the reservoir an equal bulk of the water is expelled therefrom, which, having no other way of escape, is forced to pass through such compressed material and through the pervious plunger with the juice extracted from the material. The penetration of the cells in the material by a suitable fluid assists most efficiently in removing the extract therefrom, and the operation, which will be obstructed when the fluid in the reservoir is wholly replaced by the spent material, will be rendered continuous by supplying additional fluid, as may be required, to the reservoir and discharging the spent material intermittently therefrom.

The apparatus is intended to exert a high degree of pressure upon the material subjected to the action of the plunger, and the force exerted compresses the material to such a degree that it sinks voluntarily to the bottom of the reservoir, which is shown of tapering form to direct the material toward an outlet provided with a gate $w$. The opening of such gate permits the discharge of the spent material at convenient intervals, and thus avoids the stoppage of the apparatus, as would occur if the reservoir became filled with such material. A fluid-supply pipe $w'$ is inserted in the upper part of the reservoir and provided with a cock $w^2$. This supply-pipe will, in practice, be connected with a suitable pump or other source of fluid under pressure, and the fluid may thus be supplied continuously at a suitable rate during the operation of the apparatus, or the apparatus may be operated by permitting the supply of fluid to enter through the pipe $w'$ only at the time the gate is opened, thus replacing the material discharged from the reservoir and restoring the apparatus immediately to a condition for continued operation. With this apparatus the operation need never to be interrupted for an appreciable length of time, and it may therefore be regarded as adapted for a continuous extracting process.

The apparatus shown in Figs. 2 to 7, inclusive, is provided with means for introducing a supply of fluid to the mass of compressed material adjacent to the compressing-plunger and with means for directing the course of the fluid through such compressed material to the strainer in the plunger, while the spent material is afforded a discharge directly from the compressing-cylinder. Means are also provided for maintaining in the desired degree the frictional resistance to the discharge of the spent material, and the desired resistance is thus opposed to the plunger without a body of fluid or other substance in contact with the material. With such construction there is no necessity for any reservoir of fluid, but the material is discharged directly from the compressing-cylinder.

In Figs. 2 to 7 C is the bed of the apparatus; T, the compressing-cylinder; $e$, a hopper attached thereto and communicating through an aperture $e'$ with the interior of the cylinder. Bearings $f$ are formed upon the bed to carry a shaft $b$, provided intermediate the bearings with a cam $a$, and at each side of the cam with a crank $c$, connected by means of rods $d$ with a cross-bar $g$, fitted through the rear end of the plunger B'. The operative end of the plunger is shown provided with a strainer $s$, consisting of a strip of metal coiled spirally like a clock-spring and inserted edgewise in a recess $r$, having concave bottom. A gutter $h$ is affixed to the front end of the cylinder T, and a groove $s'$ is formed in the bottom of the plunger, communicating with a hole $i$, formed at the rear of the concave recess $r$. Holes $t$ connect the bottom of the recess with the hole $i$, so that the fluid passing through the strainer $s$ escapes by the groove $s'$ and gutter $h$ to any suitable receptacle. Instead of forming the end of the plunger with a recess having a concave bottom, as shown at $r$, the end of the plunger may be made convex, as shown in Fig. 8, and the coiled spring attached thereto by a bolt in the center. By having a concave or convex seat behind the spring the pressure operates to push the coils backward, and thus to slide them upon one another at each compressing-stroke, the interstices between the coils being thus automatically cleansed of any material that may be crowded therein. When the end of the conduit is made convex, as in Fig. 8, it is not absolutely essential that holes, as those shown at $t$ in Fig. 6, should be made in the seat which sustains the spring to conduct the fluid from its rear side, as the plunger would necessarily be fitted to the cylinder loose enough to move freely, and the fluid escaping between the coils of the spring could thus obtain an outlet all around the plunger to escape to the gutter $h$. The plunger is shown in Fig. 5 retracted to admit a charge of crude material, and would in practice be moved past the aperture $e'$ to the dotted line $j$, representing the surface of the compressed material.

$k$ is a conical regulator inserted in the rear end of the compressing-cylinder, and operated to discharge a supply of fluid into the compressed material, and to permit the discharge of such material at each stroke of the plunger from the open end of the cylinder through the annular space $d$, surrounding the base of the regulator. A pipe $p$ is inserted in the side of the regulator, outside of the cylinder, and delivers fluid to an aperture $k'$, extended nearly to the point of the regulator and provided with lateral openings $k^2$. The regulator is provided with a square shank fitted to a guide-bearing $l$, and with an anti-friction roller $m$ fitted to bear against the cam $a$ on the crank-shaft $b$. One end of the crank-shaft is provided with a fly-wheel F and the opposite end with a crank-pin G, adapted to actuate a pump piston-rod H, fitted to a pump I for delivering fluid to the pipe $p$. The crank-pin is shown fixed upon a circular disk provided with a screw G', by which the crank-pin could be adjusted to and from the center of the shaft in the manner well known for such constructions and commonly used in connection with various kinds of feed mechanism. The crank-shaft may be rotated by any suitable means in the direction of the arrow J, as by a handle applied to the fly-wheel F, thus revolving the cranks $c$ and reciprocating the plunger B' past the opening of the hopper and simultaneously actuating the pump piston-rod H and the regulator $k$.

In Figs. 2 and 3 it will be noticed that the cam is formed with a concentric surface, excepting one side which is nearly flat, and thus operates to hold the regulator forward in the compressing-cylinder during the outward stroke of the plunger to receive a charge of crude material. The highest point of the cam is coincident with the projection of the cranks $c$, so that when the plunger is moved forward to operate upon the compressed material the flat side of the cam permits the outward movement of the regulator $k$, in a slight degree, to discharge the spent material through the annular outlet $d$. The annular outlet $d$ is so proportioned that the material can only escape through it under great frictional resistance, and the spent material within the cylinder thus serves as an abutment (to the desired degree) for the compression of the crude material when the plunger is pressed against it. The flat side of the cam, which permits the regulator to move slightly outward, diminishes the resistance to the escape of the spent material just before the end of the plunger's compressing-stroke, and therefore a portion of such stroke is utilized, after the crude material is compressed, to discharge the spent material from the cylinder. The crank-pin G, which operates the pump piston-rod, is so adjusted as to propel a charge of fluid into the aperture $k'$ within the regulator during the retraction of the plunger. At this time the pressure upon the material $a^4$ is reduced at the forward end while the conical regulator advances or is held stationary and maintains the compression upon the material in the annular outlet $d$. The fluid thus introduced is intended to pass through the compressed material, and to escape from the compressing-cylinder only through the strainer $s$, and such movement of the fluid is secured by the conical form of the regulator past which the spent material is forced, and the resistance of which increases toward the base of the cone, so that the fluid ejected from the aperture $k'$ tends to move forward in the cylinder rather than to escape by the annular passage $d$ with the spent material. The next compressing-stroke of the plunger B' upon the fresh charge of crude material then serves to discharge the fluid through the same, and from the compressed material behind it through the strainer $s$, so that the material is continuously treated by the fluid as well as by the compression exerted to remove the extract therefrom. The rods $d$ are inserted through holes in the cross-bar $g$ and are provided upon opposite sides of the bar with jam-nuts $d'$, by which the plunger may be adjusted to and from the hopper-inlet $e'$ and the regulator $k$. If the conduit or passage $k'$ within the regulator were open at the front end of the same, it would possibly be clogged by the compressed material; but by forming the conduit with a solid conical point the material is easily divided when it encounters the regulator, while the inclination of the fluid-outlet $k^2$ backward from the conical point enables the compressed material to pass over them without clogging the same.

The proportions of the regulator in relation to the end of the compressing-cylinder and the movement required at each stroke to secure a discharge of the spent material are in practice varied to suit the nature of the material, as sugar-cane, beets, apples, hops, and other materials all require a slight variation in the proportions of the apparatus to subject them to the desired pressure. The penetration of the regulator within the cylinder T and the resistance to the discharge of the material may be varied by making the regulator and cylinder adjustable in relation to one another, and the same machine thus be regulated to operate on different materials. Thus the cylinder-feet may be made with slots $o$ and the bolts $n$ inserted in the slots, thus making the cylinder adjustable on the bed to and from the regulator $k$, as shown in Fig. 4. The nuts $d'$ afford a means of adjusting the plunger in the cylinder when thus set.

The operation of the apparatus is as follows: The crude material, ground or disintegrated to the required degree, is fed to the hopper and falls into the compressing-cylinder at each backward stroke of the plunger. The forward end of the plunger forces the material toward the regulator until its friction against the sides of the compressing-cylinder and the resistance of the regulator oppose the movement of the material with the desired degree of resistance. The plunger then operates efficiently to compress each new charge of material in the desired manner, the juice or fluid extracted therefrom passing through the strainer $s$ and thence to the gutter $h$, from which it may be collected in bulk. At each backward stroke of the plunger fluid is ejected from the aperture $k'$, in the regulator, by the action of the pump I and connecting devices, and such fluid is projected forward through the compressed material and through the fresh charge of crude material to operate in extracting the fluid more effectively from the latter. The spent material is discharged at each stroke from the annular outlet $d$ around the base of the regulator, and the operation is thus rendered continuous so long as the material is supplied.

In the construction shown in Fig. 1 the connection between the cylinder and the force-pump (or equivalent means) used for supplying fluid under pressure to the pipe $w'$ is formed by means of the reservoir A, which is adapted by its open connection with the cylinder or neck A' to supply the fluid under pressure within the same as desired. In this construction the neck A' serves as the compressing-cylinder, and the fluid in the reservoir A serves as a fluid-connection between the pipe $w'$ and the compressing-cylinder, in the same manner as the aperture $k'$ in the regulator $k$ serves to deliver the fluid within the cylinder in the other constructions shown herein.

Having thus set forth my invention, what I claim herein is—

1. In an extracting apparatus, the combination, with a compressing-cylinder adapted to confine the juice or fluid and direct the same wholly to a pervious plunger, and having an inlet for crude material, of a pervious plunger reciprocated within such cylinder, a force-pump for supplying fluid under pressure to the cylinder, and a fluid-connection connecting the pump and cylinder to deliver the fluid therein, as and for the purpose set forth.

2. In an extracting apparatus, the combination, with a compressing-cylinder adapted to confine the juice or fluid and direct the same wholly to a pervious plunger, of a pervious plunger reciprocated within one end of such cylinder, a discharge-regulator provided with an aperture within the opposite end of such cylinder, a force-pump and a pipe connecting the pump with the aperture of the discharge-regulator for supplying fluid under pressure to the cylinder, substantially as herein set forth.

3. In an extracting apparatus, the combination, with a compressing-cylinder adapted to confine the juice or fluid and direct the same wholly to a pervious plunger and having an inlet and hopper at one side of the same, of a pervious plunger reciprocated in and out of such cylinder past the hopper-inlet, a conical regulator provided with a water-conduit opening within the cylinder, and reciprocated in the discharge end of the cylinder and forming therewith an annular exit-passage for the compressed material, and a force-pump and pipe connecting the pump with the conduit through the regulator to supply fluid under pressure thereto, as and for the purpose set forth.

4. In an extracting apparatus, the combination, with a compression-cylinder adapted to confine the juice or fluid and direct the same wholly to a pervious plunger, and having an inlet and hopper at one side of the same, of a pervious plunger reciprocated in and out of such cylinder past the hopper-inlet, a conical regulator having a solid conical point and provided with an internal conduit having the outlet-apertures $k^2$ inclined backward from the point, a guide for sustaining the regulator movably within the end of the cylinder, and a cam for moving the regulator, substantially as herein set forth.

5. In an extracting apparatus, the combination, with a compressing-cylinder adapted to confine the juice or fluid and direct the same wholly to a pervious plunger, of a plunger and a coiled spiral spring secured upon its operative end to serve as a screen, the plunger being provided with a seat adapted to permit the yielding of the spring under pressure and having a discharge-outlet from the seat, as and for the purpose set forth.

6. In an extracting apparatus, the combination, with a compressing-cylinder adapted to confine the juice or fluid and direct the same wholly to a pervious plunger, of a pervious plunger reciprocated within such cylinder, a conical discharge-regulator having an aperture opening within the cylinder, a force-pump and a pipe connecting such pump with the aperture of the regulator, and means connected with the reciprocating plunger for operating the pump, as and for the purpose set forth.

7. In an extracting apparatus, the combination, with a compressing-cylinder, of a pervious plunger reciprocated within such cylinder, a conical discharge-regulator having an aperture opening within the cylinder, a pipe connected with such aperture, and a pump provided with a plunger actuated by an adjustable crank-pin, the pump being connected with the pipe for delivering a regulated volume of fluid, as and for the purpose set forth.

8. In an extracting apparatus, the combination, with a compressing-cylinder, of a pervious plunger reciprocated within such cylinder, a conical discharge-regulator provided with an aperture and connected with a supply of fluid under pressure, and means for adjusting the cylinder toward the regulator to vary the outlet-opening from the cylinder, as and for the purpose set forth.

In testimony whereof I have hereunto set my hand in the presence of two subscribing witnesses.

JOHN W. HYATT.

Witnesses:
THOS. S. CRANE,
L. LEE.